United States Patent
Kanevsky et al.

(10) Patent No.: US 6,219,407 B1
(45) Date of Patent: Apr. 17, 2001

(54) APPARATUS AND METHOD FOR IMPROVED DIGIT RECOGNITION AND CALLER IDENTIFICATION IN TELEPHONE MAIL MESSAGING

(75) Inventors: Dimitri Kanevsky, Ossining, NY (US); Stephane Herman Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/008,471

(22) Filed: Jan. 16, 1998

(51) Int. Cl.[7] .............................. H04M 1/64; H04M 11/00
(52) U.S. Cl. ...................... 379/88.02; 379/67.1; 379/80; 379/88.22; 379/93.03
(58) Field of Search .................. 379/67.1, 71, 76, 379/80, 88.01, 88.02, 88.04, 88.07, 88.08, 88.22, 88.26, 88.27, 93.03, 157, 201, 93.23, 243; 704/243, 255, 260, 275

(56) References Cited

U.S. PATENT DOCUMENTS

| | | | |
|---|---|---|---|
| 4,935,954 | * 6/1990 | Thompson et al. | 379/88 |
| 4,942,598 | * 7/1990 | Davis | 379/57 |
| 5,199,080 | 3/1993 | Kimura et al. | 381/110 |
| 5,465,401 | * 11/1995 | Thompson | 455/89 |
| 5,479,490 | 12/1995 | Nakashima | 379/74 |
| 5,568,540 | * 10/1996 | Greco et al. | 379/88 |
| 5,572,578 | * 11/1996 | Lin et al. | 379/88 |
| 5,594,789 | 1/1997 | Seazholtz et al. | 379/207 |
| 5,604,790 | 2/1997 | Grimes | 379/67 |
| 5,608,784 | 3/1997 | Miller | 379/88 |
| 5,621,849 | 4/1997 | Sakurai et al. | 395/2.5 |
| 5,732,216 | * 3/1998 | Logan et al. | 395/200.33 |
| 5,761,271 | * 6/1998 | Karnowski | 379/1 |
| 5,822,405 | * 10/1998 | Asterabadi | 379/88 |
| 5,848,130 | * 12/1998 | Rochkind | 379/67 |
| 5,883,942 | * 3/1999 | Lim et al. | 379/142 |
| 5,924,070 | * 7/1999 | Ittycheria et al. | 704/275 |
| 5,930,338 | * 7/1999 | McKendry et al. | 379/88.25 |

OTHER PUBLICATIONS

Richard C. Rose, "Word Spotting From Continuous Speech Utterances", Automatic Speech and Speaker Recognition, Advanced Topics Recognition, pp. 303–329, Kluwer Academic Publishers, 1996.

Zeppenfeld et al., "Recognition of Conversational Telephone Speech Using the Janus Speech Engine", ICASSP 97, vol. III, pp. 1815–1818, 1997.

* cited by examiner

*Primary Examiner*—Fan Tsang
*Assistant Examiner*—Allan Hoosain
(74) *Attorney, Agent, or Firm*—F. Chau & Associates, LLP

(57) ABSTRACT

A telephone voice mail messaging system for performing recognition of characters included in a telephone message left by a caller includes: speaker recognition means, responsive to the telephone message, for extracting a voice model of the caller from the telephone message and comparing the voice model of the caller against a plurality of pre-obtained voice model's respectively associated with a plurality of potential callers to find a pre-obtained voice model from among the plurality of pre-obtained voice models that matches the voice model of the caller and, if the matching pre-obtained voice model is found, then the speaker recognition means identifying at least one pre-obtained set of characters attributed to a potential caller from among the plurality of potential callers associated with the matching pre-obtained voice model; character spotting means, responsive to the telephone message, for identifying sets of characters in the telephone message; and comparator means for comparing characters of the at least one pre-obtained set of characters identified by the speaker recognition means against characters of a set of characters identified by the character spotting means and, if the characters match, then outputting the characters of the at least one pre-obtained set of characters as representing the set of characters left by the caller as part of the telephone message.

42 Claims, 3 Drawing Sheets

APPARATUS AND METHOD FOR IMPROVED DIGIT RECOGNITION AND CALLER IDENTIFICATION IN TELEPHONE MAIL MESSAGING

BACKGROUND OF THE INVENTION

The present invention relates to speech/speaker recognition and telephone mail messaging and, more particularly, to apparatuses and methods for improved digit recognition and/or caller identification utilizing speech/speaker recognition in telephone mail messaging.

Typically, in a telephone system having a voice mail feature, a caller leaves a telephone message which may include his name, telephone number and/or a brief request or message on a receiving party's voice mail equipment. As is known, the telephone number that is left usually informs the voice mail user where the caller may be reached over the telephone. Conventional automatic speech recognition (ASR) decoding may provide the user with a decoded text representation of the phone message. However, an error in decoding even one digit of the telephone number of the caller can make an entire telephone message useless since a user may not be able to return a call (unless, of course, the user plays back a recorded representation of the phone message).

There exist telephone devices (and services) that allow a receiving party to trace back or record a telephone number of a telephone set from which a caller placed a call. However, this is not always useful since a caller may have called from some temporal location (e.g., a street phone) or may have left a telephone number to call back that is different from a telephone number at his current location. Furthermore, user identification alone does not help to identify the phone number to call back since the caller may have many phone numbers where he can be reached, e.g., home, office, hotels during his travels, etc.

In addition to voice mail messaging systems, a fast growing area in the consumer communications market is text-independent speaker recognition as disclosed in U.S Ser. No. 08/788,471 filed on Jan. 28, 1997, entitled: "Text-independent Speaker Recognition for Command Disambiguity and Continuous Access Control". It is known that a problem with text-independent speaker recognition is that a textual context, in general, is difficult to use to improve the accuracy of speaker recognition. Also, with regard to telephone applications, since the bandwidth associated with a typical telephone line may tend to reduce the accuracy associated with ASR, telephone continuous speaker-independent recognition decoding has been considered to be a challenging task. Especially with the additional difficulties of microphone mismatch (e.g., speaker phone, cellular phones, carbon and/or electric microphones) and channel variability (e.g., from one phone call to another, the path through the telephone network can vary dramatically, which in turn has a severe effect on the distortions and signature introduced by the channel).

It would be highly desirable and advantageous to provide apparatuses and methods which overcome the drawbacks and limitations described above with respect to ASR decoding of telephone voice mail messaging as well as telephone continuous speaker-independent recognition decoding.

SUMMARY OF THE INVENTION

It is an object of the present invention to provide apparatuses and methods for performing speaker recognition in order to reduce a level of confusion and/or error in automatic speech, recognition (ASR) of digits of a telephone number left by a caller in a voice mail phone at message.

It is another object of the present invention to provide apparatuses and methods for utilizing automatic speech recognition of digits of a telephone number left by a caller in a voice message to improve automatic speaker recognition of the caller's identity.

In one aspect of the present invention, a telephone voice mail messaging system for performing recognition of characters included in a telephone message left by a caller comprises: speaker recognition means, responsive to the telephone message, for extracting a voice model of the caller from the telephone message and comparing the voice model of the caller against a plurality of pre-obtained voice models respectively associated with a plurality of potential callers to find a substantial match between the voice model of the caller and one of the voice models associated with one of the potential callers and, if a substantial match is found, then the speaker recognition means identifying at least one pre-obtained set of characters attributed to the potential caller associated with the substantially matching voice model; character spotting means, responsive to the telephone message, for identifying sets of characters in the telephone message; and comparator means for comparing the characters of the at least one pre-obtained set of characters identified by the speaker recognition means against the characters of a set of characters identified by the character spotting means and, if the characters of the sets substantially match, then outputting the characters of the at least one pre-obtained set of characters as representing the set of characters left by the caller as part of the telephone message. Such character set may preferably be combined with a decoded representation of the telephone message to form a corrected decoded message, which may be provided to a user interface unit (preferably, a CRT display terminal) so that a voice mail user may learn who called him, what the return telephone number is, and any request or message left. The user interface unit may also preferably provide the user with the ability to selectively place a return call, read the message or play back an audio representation of the message.

It is to be appreciated that sets of characters may include: both numbers and letters, as in addresses; numbers only, as in telephone numbers and social security numbers; or letters only, such as in names. Such examples are only exemplary and thus other character sets may be employed.

In another aspect of the present invention, a telephone voice mail messaging system for performing caller identification with respect to a telephone message left by a caller comprises: character spotting means, responsive to the telephone message, for identifying sets of characters in the telephone message and comparing an identified set of characters against a plurality of pre-obtained sets of characters associated with a plurality of potential callers to find a substantial match between the identified set of characters and at least one of the pre-obtained sets of characters and, if a substantial match is found, then the character spotting means further identifying a list of potential callers attributed to the at least one substantially matching pre-obtained set of characters; and speaker identification means, responsive to the telephone message, for extracting a voice model of the caller from the telephone message and comparing the voice model of the caller against respective voice models associated with the potential callers on the list to find a substantial match between the voice model of the caller and the voice model of one of the potential callers and, if a substantial match is found, then the speaker identification means identifying the potential caller associated with the substantially matching voice model. The identity of the caller may preferably be provided to a service access server which may selectively permit the user access to a service. Still further, the identity of the caller may preferably be provided to a user interface unit with similar capabilities as mentioned above and described herein.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
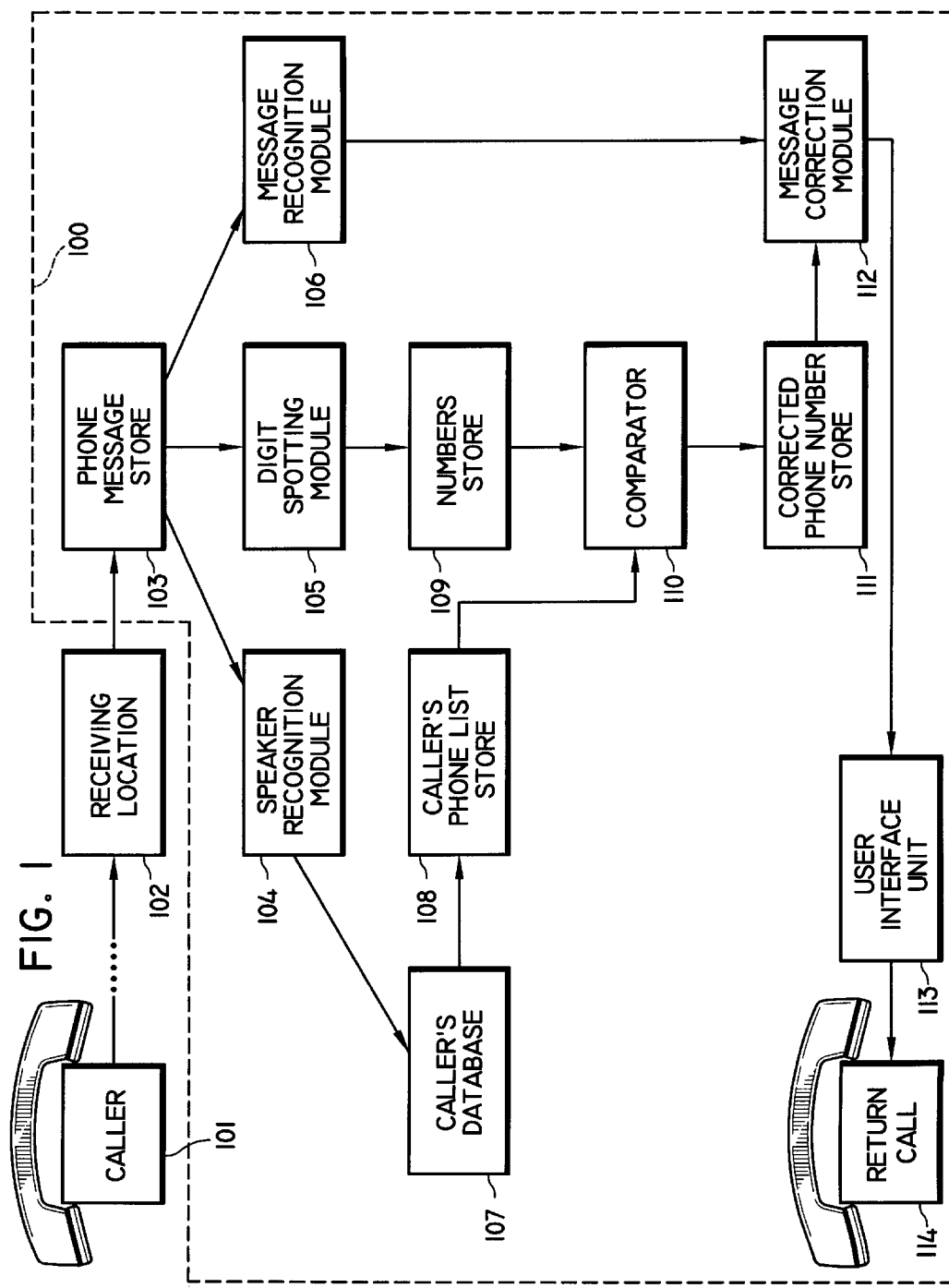
FIG. 1 is a block diagram illustrating an improved telephone digit recognition system based on speaker/speech recognition according to the present invention.

Referring initially to FIG. 1, a preferred embodiment of a telephone voice mail messaging, system (i.e., telephone digit recognition system) for performing digit recognition and a preferred method thereof, according to the present invention, is illustrated. The telephone digit recognition system 100 includes a phone message store 103 respectively operatively coupled to a speaker recognition module 104, a digit spotting module 105 and a message recognition module 106. The system 100 also includes a callers database 107, operatively coupled to the module 104, and a caller's phone list store 108, operatively coupled to the callers database 107. Further, the system 100 includes a number store 109, operatively coupled to the digit spotting module 105, and a comparator 110 which is operatively coupled to both the number store 109 and the caller's phone list store 108. Still further, the system 100 includes a corrected phone number store 111, operatively coupled to the comparator 110, and an ASR message correction module 112 which is operatively coupled to both the message recognition module 106 and the corrected phone number store 111. A user interface unit 113 is also provided by the system 100 which is operatively coupled to the correction module 112, while a user telephone 114, operatively coupled to the user interface unit 113, is included in the system 100. Given the above-described preferred connectivity between system components, the operation of system 100 will now be explained.

A caller calls from a telephone set 101 to a receiving location 102. It is to be appreciated that the receiving location 102 may be a telephone system located within a corporate office buildings (i.e., PBX) which transfers the call to the appropriate voice mail extension or it may simply be the location where the system 100 is located (i.e., office, home, etc.). Assuming the caller does not reach the desired party, the caller leaves a voice mail phone message which is stored in the phone message store 103. The store 103 may be an audio recorder for recording the audio message provided by the caller for future playback/verification. However, it is to be appreciated that the audio message does not necessarily have to be stored and, rather, it may be presented directly to the remainder of the system to be processed by the three modules: the speaker recognition module 104; the digit spotting module 105; and the message recognition module 106, as will be explained.

The phone message is provided to the speaker recognition module 104. It is to be appreciated that the speaker recognition module 104 is preferably a text-independent speaker recognition system as disclosed in U.S. Ser. No. 08/788,471 filed on Jan. 28, 1997, entitled: "Text-independent Speaker Recognition for Command Disambiguity and Continuous Access Control". The module 104 decodes the caller's voice samples taken from the phone message and generates a set of acoustic prototypes (i.e., voice model) therefrom. The callers database 107 contains sets of acoustic prototypes (i.e., voice models) for a selected number of callers who may call the user on a regular basis. However, the invention is not so limited. That is, the database 107 may contain sets of acoustic prototypes for a large number of members of a population, provided that sets of acoustic prototypes have been obtained for each member or provided that each member may be associated with a set of acoustic prototypes pertaining to a class of members sharing similar acoustic characteristics. Nonetheless, voice samples may be obtained either from a separate training procedure, as is known in the art, or during a time (preferably, the first time) when the caller leaves a voice mail message. The callers database 107 also contains a telephone number or a list of telephone numbers associated with each caller having acoustic prototypes stored therein.

The module 104 searches the database 107 for a set of acoustic prototypes that substantially matches the caller's set of acoustic prototypes. It is to be appreciated that one standard for determining a substantial match between the sets of acoustic prototypes may employ a distance score. As is known in the art, a distance score provides a measure of the closeness (with respect to, for example, a Euclidian distance or likelihoods of probability, etc.) between the caller's prototypes and the stored prototypes. Nonetheless, once a set of acoustic prototypes which substantially matches the caller is determined, and thus the person associated with the identified prototypes is determined, the telephone number or list of telephone numbers correspondingly stored with the identified person in the database are provided to and stored in the caller's phone list store 108. This phone list preferably contains the telephone numbers that a prospective caller is using (home, office, club, etc.) in order that he may be reached. The list of telephone numbers in store 108 is then sent to the comparator 109.

Substantially in parallel with the above steps, the digit spotting module 105 is provided with the phone message from phone message store 103 and, in response, decodes a telephone number derived from the phone message left by the caller, assuming a telephone number is included in the message. The telephone number is stored in number store 109. It is to be appreciated that the digit spotting module is preferably an automatic speech recognition (ASR) module similar to that disclosed in the article (and associated references) by Richard C. Ross, "Word Spotting from Continuous Speech Utterances", Automatic Speech and Speaker Recognition, Advanced Topics, pp. 303–327, edited by Chin-Hui Lee, Frank K. Soong, Kuldip K. Paiwal (Kluwer Academic Publishers) 1996. This article gives a description of methods for word (e.g., command) spotting. Digit spotting is accomplished in a similar manner. However, since the digit spotting module 105 is processing telephone speech and operates as a speaker-independent (continuous) ASR, the module 105 can make several decoding errors that need to be fixed in order that the correct telephone number is provided to the user attempting to return the caller's call.

Thus, the number spotted by module 105 and stored in store 109 is provided to the comparator 110 along with the list of actual telephone numbers associated with the caller, which were identified through module 104 and database 107 and stored in caller's phone list store 108, as explained above.

In the comparator 110, the telephone number from store 109 is compared against the caller's telephone number list from store 108. If the comparator 110 finds a telephone number in the list from store 108 that differs from the telephone number from store 109 by a small number of digits (as compared with the overall length of the telephone number), then the comparator 110 provides this telephone number from the list to the corrected phone number store 111 as the corrected telephone number. For example, if the spotted phone number string stored in store 109 is 9147825341 and there is a telephone number in the list from store 108 such as 9147625341, then because the former number (spotted number) differs from the latter number (listed number) by only one digit (i.e., the fifth digit of the number reading left to right), the system determines that the difference is due to a decoding error in the digit spotting module and, thus, the listed number is determined to be the actual number left by the caller and is provided to the corrected phone number store 111, i.e., the corrected number would be 9147625341. It is to be understood that the degree of error (i.e., the number of non-matching digits) that the system will permit depends on the overall length of the telephone number. The invention does not limit the degree of error and thus the degree of tolerable errors may be adjusted accordingly depending on a known accuracy of the digit spotting module employed. Of course, if there is an exact match, then that number is stored in store 111. If no telephone number in the list is close to the spotted number, then the system may treat this as a totally new number and display it to the user (on the user interface unit, as will be explained) or the user may be instructed to play back the recorded message (if stored in phone message store 103) to audibly verify the number. Also, the voice mail user may have the information about the new speaker (name, telephone number, address, voice models, etc.) added to the system so that such speaker may be recognized in future calls (i.e., enrollment of new caller).

Still further, substantially in parallel with the speaker recognition steps performed by the speaker recognition module 104, the digit spotting steps performed by the digit spotting module 105 and the comparison of their associated results by comparator 110, the message recognition module 106 is provided with the phone message. The message recognition module 106 also includes an automatic recognition system (ASR) such as, for example, that disclosed in the article (and associated references) by Zeppenfeld et al., "Recognition of Conversational Telephone Speech Using the Janus Speech Engine", Proceedings of ICASSP 97, pp. 1815, vol. 3 (1997). The message recognition module 106 decodes the phone message into, for example, an ASCII file, and provides the decoded message to the ASR message correction module 112. It is to be appreciated that once the speaker has been identified (via speaker recognition module 104), speech recognition models trained on that speaker may be used to decode the utterances from that speaker or the closest class-based models, as disclosed in U.S. Ser. No. 08/787,031, entitled: "Speaker Classification for Mixture Restriction and Speaker Class Adaptation", may be used to decode such utterances. Also, unsupervised training may be done on long text.

Nevertheless, the correction module 112 replaces the telephone number in the decoded message, with the corrected phone number from store 111. The corrected phone message is then provided to the user interface unit 113, which may preferably be a CRT display terminal, where the user reviewing the voice mail message may view the caller's name, his telephone number and any statement (request or message) left during the call. An example of the user interface unit 113 will be explained below in the context of FIG. 2. Also, it is to be appreciated that the spotted string of numbers (from store 109) may be written in brackets next to the corrected telephone number so that a user may read the two numbers and, based on his knowledge of the caller and his number, decide which is the correct number. Also, as will be explained in the context of FIG. 2, the user may select (e.g., click with a mouse) the phone string in the message as displayed on interface unit 113 and activate a return call to the caller via telephone 114.

In an alternative embodiment, the system 100 may be used to improve recognition of names or addresses that may be left in a phone message in a similar manner as it improves digit recognition, as explained above. In such an alternative embodiment, the system compares (comparator 110) a user name and/or address that it finds in the callers database 107 (in cooperation with acoustic prototypes, as explained above) to a name and/or address that is, decoded by a spotting module (similar to module 105 but that is extended to spotting characters including letters and numbers). If there is a substantial match, then the listed name and/or address is inserted into the corrected ASR message (by correction module 112). Other sets of characters, both letters and/or numbers, may also be processed by the invention.

In a further alternative embodiment of the system 100, the output of message recognition module 106 corrected by the correction module 112 and output to the user interface unit 113 may only include spotted numbers and/or names, rather than also including a request or message. This may be beneficial in a case where the recognition quality of the speaker continuous telephone ASR message is not satisfactory. In such an embodiment, a user may be provided with a list of telephone numbers and/or names at his interface unit 113 (display terminal) and he may then select (click on) some telephone number and/or name (or click on a separate field, as will be explained) to activate and play back the audio representation of the phone message, stored in audio recorder 103, so that the request or general message may be heard.

In yet another alternative embodiment of the system 100, digit spotting may still further be improved by performing the speaker recognition first, via speaker recognition module 104, from which the list of phone numbers associated with the identified caller is obtained (store 108). Then, after the speaker recognition steps are accomplished, the spotting of the digits in a phone message by the digit spotting module 105 is performed but, advantageously, restricted to spotting numbers from the caller's phone list from store 108. Thus, when digit spotting is restricted to some particular numbers, rather than spotting any and all digits, digit recognition accuracy is known to be higher.

Figure 2:
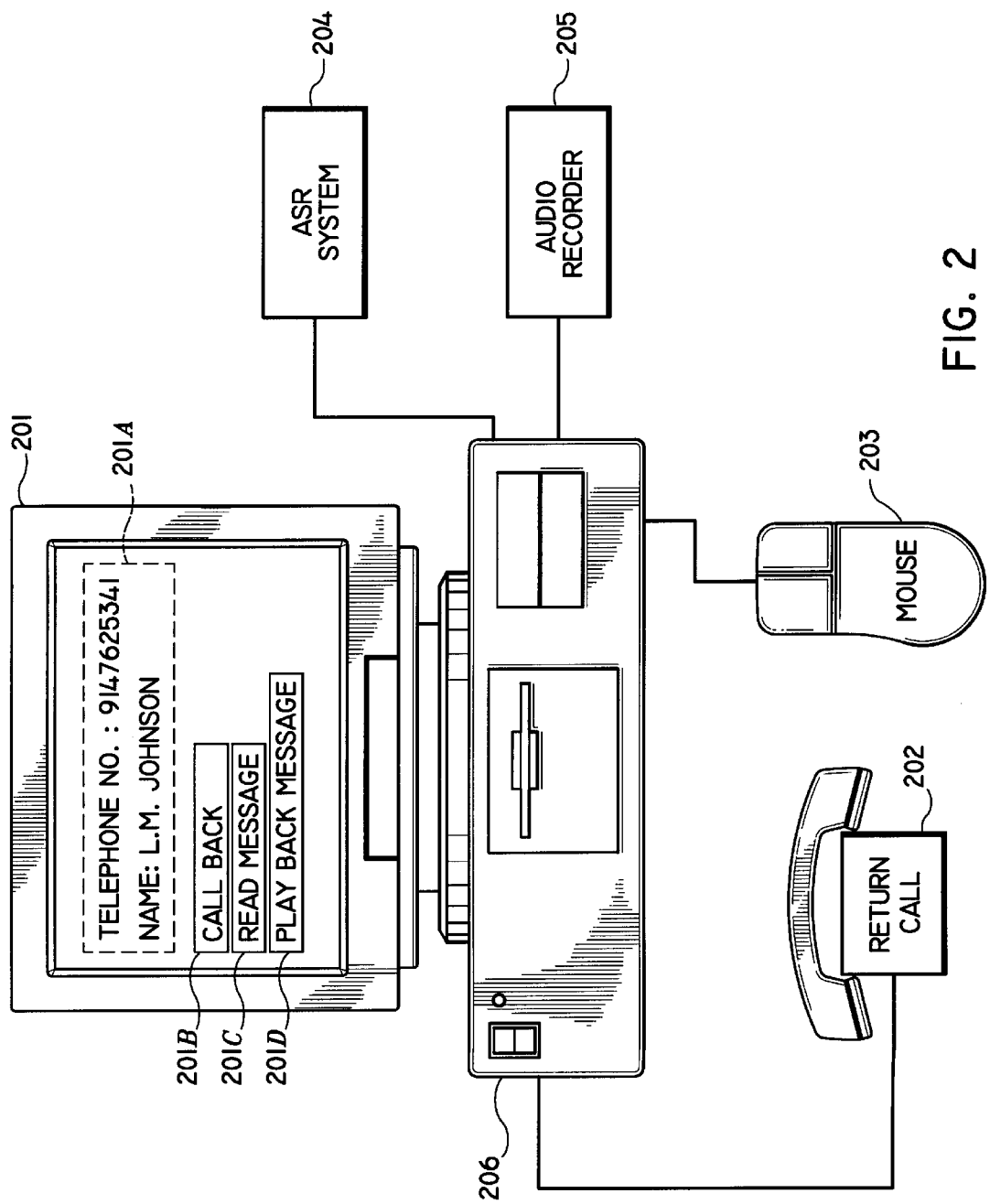
FIG. 2 is a block diagram illustrating a system for performing the invention including a user interface unit according to the present invention.

Referring now to FIG. 2, an exemplary embodiment of a system 100 is shown. The system includes terminal 201, telephone 202, mouse 203, ASR system 204, audio recorder 205, and associated computer 206 for interfacing with the other devices and executing appropriate functions of the invention described herein. It is to be understood that the ASR system 204 may be used to perform the message recognition function (e.g., message recognition module 106) described herein; however, the computer 206 may share or completely perform such function.

Also, the recorder 205 is used to record an audio representation of the voice mail message left by the caller (shown as phone message store 103 in FIG. 1). It is further to be understood that the terminal 201 serves as the user interface unit described herein (unit 113 in FIG. 1). An exemplary visual presentation for display to the user on terminal 201 is also shown. Accordingly, such a terminal 201 displays a graphical and/or textual user interface which includes a field 201A containing the telephone number (e.g., 9147625341) and name (e.g., L. M. Johnson) of a caller determined by the system, as explained herein. The interface also provides several options to the user. For instance, the mouse 203 permits the user to select one of the three exemplary options shown in fields 201B, 201C and 201D by clicking on one of these fields. Thus, clicking on CALL BACK field 201B activates a return call to the caller at the telephone number displayed in field 201A via the telephone 202. Further, clicking on READ MESSAGE field 201C displays the request or general message (ASCII text) left by the caller and decoded by ASR 204. Still further, clicking on PLAY BACK MESSAGE field 201D plays back the telephone message recorded by recorder 205.

Figure 3:
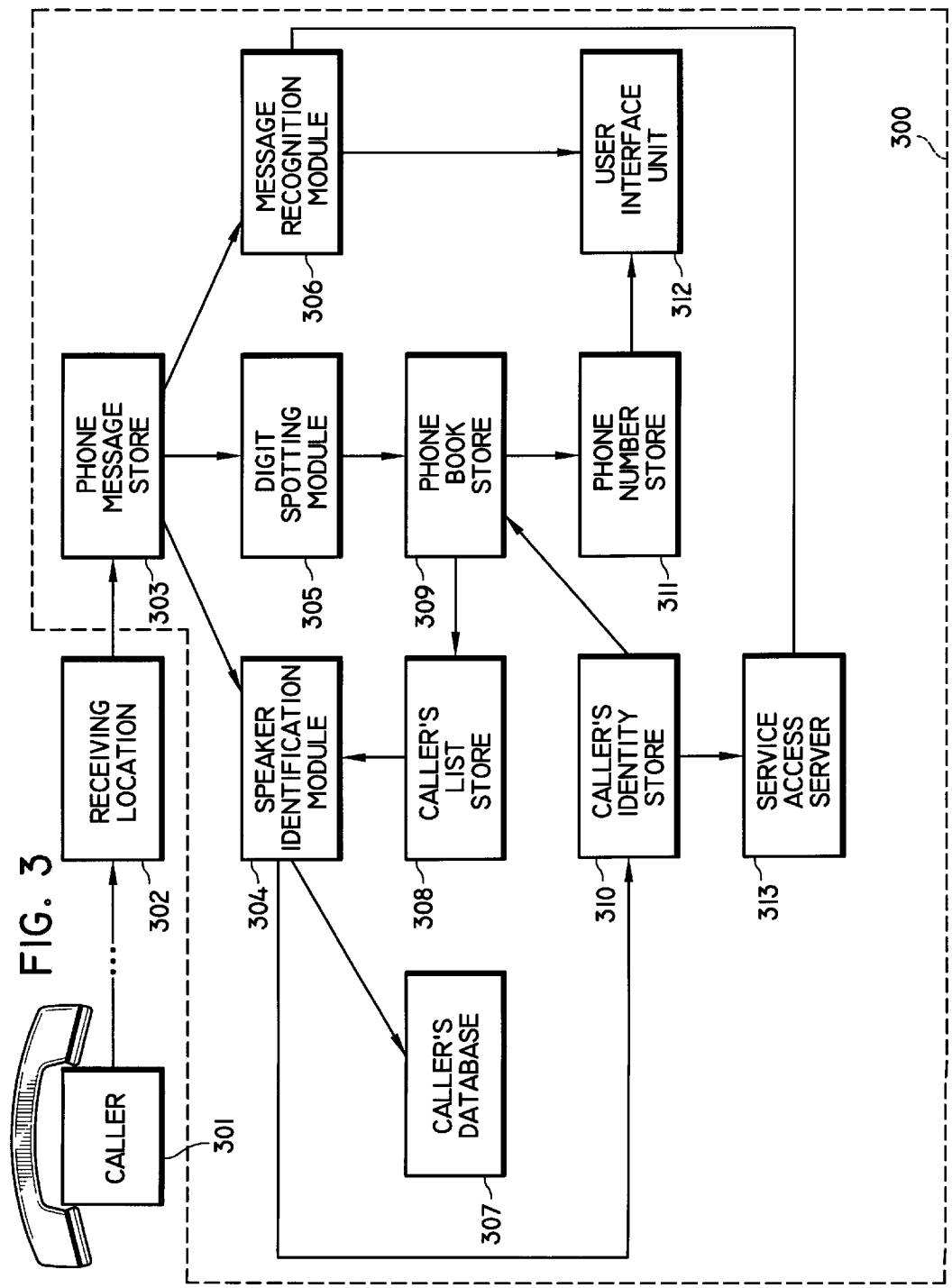
FIG. 3 is a block diagram illustrating an improved speaker recognition system based on telephone digit recognition according to the present invention.

Referring now to FIG. 3, a preferred embodiment of a telephone voice mail messaging system (i.e., telephone caller identification system) for performing caller identification and methods thereof, according to the present invention, is illustrated. The caller identification system 300 includes a phone message store 303 respectively operatively coupled to a speaker identification module 304, a digit spotting module 305 and a message recognition module 306. The system 300 also includes a callers database 307, operatively coupled to the module 304, and a callers list store 308, also operatively coupled to the module 304. Further, the system 300 includes a phone book store 309, operatively coupled to the digit spotting module 305 and to the callers list store 308. A caller's identity store 310 is also included in the system 300 which is operatively coupled between the module 304 and the phone book store 309. The system 300 further includes a phone number store 311 operatively coupled to the phone book store 309. Still further, the system 300 includes a user interface unit 312 which is operatively coupled to the message recognition module 306 and the phone number store 311. A service access server 313 is also provided by the system 300 which is operatively coupled to the caller's identity store 310 and the message recognition module 306. Given the above-described preferred connectivity between system components, the operation of system 300 will now be explained.

As in the embodiments described above with regard to FIG. 1, a caller calls from a telephone set 301 to a receiving location 302. Again, it is to be appreciated that the receiving location 302 may be a telephone system located within a corporate office building (i.e., PBX) which transfers, the call to the appropriate voice mail extension or it may simply be the location where the system 300 is located (i.e., office, home, etc.). Assuming the caller does not reach the desired party, the caller leaves a voice mail phone message which is stored in the phone message store 303. As in FIG. 1, the store 303 may be an audio recorder for recording the audio message provided by the caller for future playback/verification. However, again it is to be appreciated that the audio message does not necessarily have to be stored and, rather, it may be presented directly to the remainder of the system to be processed by the three modules: the speaker identification module 304; the digit spotting module 305; and the message recognition module 306, as will be explained.

The phone message is presented to the digit spotting module 305 from the phone message store 303. Like the digit spotting module 105 in FIG. 1, the digit spotting module 305 is preferably an automatic speech recognition (ASR) module similar to that disclosed in the Ross article and associated references. Thus, the module 305 spots (decodes) numbers (e.g., telephone numbers) in the phone message. The numbers spotted may be stored in a numbers store (not shown). Next, the spotted phone numbers are searched for in the phone book store 309. The phone book store 309 contains previously stored names and telephone numbers of frequent callers or, in a larger context, a large number of members of a population. If a match is found between the spotted number and any phone numbers in the phone book store 309, then the names of a person(s) associated with these phone numbers are extracted from the phone book store 309. These names produce the list of callers which is stored in callers list store 308. It is to be appreciated that such list may contain more than one name of possible callers for at least two reasons. First, since the spotted phone number from module 305 may be someone's home phone number, the list of potential callers preferably includes a list of names of all family members who reside in the home. Thus, such an extended list is produced and stored in store 308. Secondly, as previously mentioned, there could be some errors in a recognition of a phone number from the phone message performed by the digit spotting module 305. As a result, there may be no phone numbers in the phone book store 309 which exactly match the phone number from the phone message, but rather, only differ from one of the stored phone numbers by one or two digits. In this case, the list of callers stored in store 308 preferably consists of those people whose phone numbers in the phone book differ slightly from the phone number that was produced by the digit spotting module 305.

The phone message is also provided to the speaker identification module 304. It is to be appreciated that the speaker identification module 304 is preferably a text-independent speaker recognition system, similar to module 104 and as disclosed in U.S. Ser. No. 08/788,471 filed on Jan. 28, 1997, entitled: "Text-independent Speaker Recognition for Command Disambiguity and Continuous Access Control". The module 304 decodes the caller's voice samples taken from the phone message and generates a set of acoustic prototypes (i.e., voice model) therefrom. The callers database 307, similar to the database 107 in FIG. 1, contains sets of acoustic prototypes (i.e., voice model) for a selected number of callers who may call the user on a regular basis. Again, the invention is not so limited, in that, the database 307 may contain sets of acoustic prototypes for a large number of members of a population, provided that sets of acoustic prototypes have been obtained for each member or provided that each member may be associated with a set of acoustic prototypes pertaining to a class of members sharing similar acoustic characteristics. Nonetheless, voice samples may be obtained either from a separate training procedure, as is known in the art, or during a time (preferably, the first time) when the caller leaves a voice mail message. Preferably, the caller database 307 contains a voice model for each person in the phone book store 309.

The module 304 is also provided with the list of callers identified from the phone book store 309. The module 304 searches the voice models of the identified list of callers in the database for a set of acoustic prototypes that substantially match the caller's set of acoustic prototypes. As previously mentioned, a distance score may be used to perform the matching process. If a match is found and, thus, the caller's identity established (preferably stored in caller's identity store 310), one of several steps may occur.

First, the phone book store 309 may be visited again to extract the exact phone number that corresponds to the identified caller. Then, this phone number is combined with the output of the message recognition module 306, which decodes the phone message in a similar manner as the message recognition module 106 in FIG. 1, and such combined message is provided to the user interface unit 312, as explained above with respect to FIG. 1. A visual presentation and related peripherals (audio recorder, mouse, etc.) as described in FIG. 2 may be provided in connection with the user interface unit 312.

Secondly, the identity of the caller may be sent to the service access server 313 which may make a determination to permit or deny the caller access to a particular service. In such case, the request for access to, or performance of, a service may be decoded by the message recognition module 306 and provided to the server 313. An example of a request made by the caller may be a book order provided the service access server is associated with a book publisher or distributor.

Again, as mentioned previously, it should be understood that instead of module 305 spotting telephone numbers, it may spot names and/or addresses (or other character sets) that may be matched to names and/or addresses (or other character sets) in the phone book store 309 to generate the list of potential callers. Also, as previously mentioned, the system 300 preferably permits a voice mail user to update and add entries associated with new callers to the phone book store 309 and callers database 307 (i.e., enroll new callers). The information on the new caller (name, telephone number, address, voice models, etc.) may be based on speech recognition if no other sources of information exist.

It is to be appreciated that, given the description of the invention provided herein, one skilled in the art will be enabled to apply such teachings to unlimited applications. However, by way of example, one specific application of a system and method of the invention may be to enable the hearing impaired to read a decoded phone message on a visual presentation on a display, such as described herein, and thus learn both the identity and phone number of the person attempting to reach them. The hearing impaired person may then initiate a return call, as explained herein. This is a typical example of an application of the invention where it is possible to have a transcription of the entire phone message which is greatly aided by identifying and classifying the speaker so that speaker dependent models can be used for decoding.

Still further, another exemplary application of the invention may include a paging server performing the various functions described herein (e.g, speaker identification; name, number, and/or address spotting; and message recognition, etc.) which then transmits the decoded message to a user's pager device for display (i.e., pager device substantially serves the function of the user interface unit).

It is to be further appreciated that the present invention may be implemented in hardware, software or a combination thereof. Preferably, the invention is implemented in software and stored and executed on one or more appropriately programmed digital computers. Thus, the functional modules described herein (e.g., the speaker recognition/ identification modules, the comparator, the correction module, etc.) are preferably implemented as software routines and executed by a processor and memory (RAM and/or ROM) associated with the computer. Also, the data stores (caller phone list store, corrected phone number store, etc.) are preferably implemented by memory devices associated with the processor and the computer; however, separate memory storage devices may be employed. It is to be understood that functions may be combined and performed by a single software routine and data stored in a shared memory. Further, as explained herein, various computer input/output devices are preferably utilized to input the phone message (e.g., microphone), output the decoded ASR message information (CRT display) and select certain options presented on the display (e.g., mouse).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A telephone voice mail messaging system for performing recognition of characters included in a telephone message left by a caller, the system comprising:

speaker recognition means, responsive to the telephone message, for extracting a voice model of the caller from the telephone message and comparing the voice model of the caller against a plurality of pre-obtained voice models respectively associated with a plurality of potential callers to find a pre-obtained voice model from among the plurality of pre-obtained voice models that matches the voice model of the caller and, if the matching pre-obtained voice model is found, then the speaker recognition means identifying at least one pre-obtained set of characters attributed to a potential caller from among the plurality of potential callers associated with the matching pre-obtained voice model;

character spotting means, responsive to the telephone message, for identifying sets of characters in the telephone message; and comparator means for comparing characters of the at least one pre-obtained set of characters identified by the speaker recognition means against characters of a set of characters identified by the character spotting means and, if the characters match, then outputting the characters of the at least one pre-obtained set of characters as representing the set of characters left by the caller as part of the telephone message.

2. The system of claim 1, further comprising message recognition means, response to the telephone message, for decoding the telephone message into a decoded message representative of the telephone message which may include one of a name of the caller, a telephone number of the caller and a statement made by the caller.

3. The system of claim 2, wherein the message recognition means further comprises means for decoding the telephone message using one of a class-based model and speaker trained model identified through the speaker recognition means.

4. The system of claim 2, further comprising message correction means, responsive to the set of characters output by the comparator means and the decoded message output by the message recognition means, for replacing a corresponding set of characters decoded by the message recognition means with the set of characters output by the comparator means to form a corrected decoded message.

5. The system of claim 4, further comprising user interface means, responsive to the corrected decoded message, for displaying to a user one of the name, the telephone number, and the statement of the caller from the corrected decoded message.

6. The system of claim 5, wherein the system is utilized as a user paging system and the user interface unit is a pager device.

7. The system of claim 5, wherein the system further comprises:
   telephonic means, responsive to the user interface means, for permitting the user to place a telephone call; and
   selection means, operatively coupled to the user interface means, for permitting the user to select the telephone number of the caller and thus initiate a return call to the caller via the telephonic means.

8. The system of claim 5, wherein the user interface means further comprises means for selectively displaying the statement to the user.

9. The system of claim 5, wherein the user interface means further comprises means for selectively initiating an audio playback of the telephone message to the user.

10. The system of claim 1, wherein the set of characters identified by the character spotting means are limited to the characters of the at least one pre-obtained set of characters identified by the speaker recognition means.

11. The system of claim 1, wherein the pre-obtained set of characters attributed to the potential callers and the set of characters identified by the character spotting means are respectively one of a name, a telephone number and an address.

12. The system of claim 1, further comprising user interface means, responsive to the comparator means, for displaying to the user one of the set of characters identified by the character spotting means and the at least one pre-obtained set of characters from the speaker recognition means.

13. The system of claim 12, wherein the sets of characters are telephone numbers and wherein the system further comprises:
   telephonic means, responsive to the user interface means, for permitting the user to place a telephone call; and
   selection means, operatively coupled to the user interface means, for permitting the user to select the telephone number of the caller and thus initiate a return call to the caller via the telephonic means.

14. The system of claim 1, further comprising means for enrolling the caller in the system if a substantial match is not found by the speaker recognition means.

15. A telephone voice mail messaging system for performing caller identification with respect to a telephone message left by a caller, the system comprising:
   character spotting means, responsive to the telephone message, for identifying sets of characters in the telephone message and comparing an identified set of characters against a plurality of pre-obtained sets of characters associated with a plurality of potential callers to find a pre-obtained set of characters from among the plurality of pre-obtained sets of characters that matches the identified set of characters and, if the matching pre-obtained set of characters is found, then the character spotting means further identifying a list of potential callers attributed to the matching pre-obtained set of characters; and
   speaker identification means, responsive to the telephone message, for extracting a voice model of the caller from the telephone message and comparing the voice model of the caller against respective voice models associated with potential callers on the list to find a respective voice model from among the respective voice models that matches the voice model of the caller and, if the matching respective voice model is found, then the speaker identification means identifying a potential caller from the list associated with the matching respective voice model.

16. The system of claim 15, wherein the pre-obtained set of characters and the set of characters identified by the character spotting means include a telephone number.

17. The system of claim 16, further comprising means for identifying an actual telephone number associated with the identified caller.

18. The system of claim 17, further comprising user interface means, responsive to the character spotting means, for displaying to a user one of a name associated with the identified caller and the telephone number associated with the identified caller.

19. The system of claim 18, wherein the system is utilized as a user paging system and the user interface unit is a pager device.

20. The system of claim 15, further comprising message recognition means, responsive to the telephone message, for decoding the telephone message into a decoded message representative of the telephone message which may include a statement made by the caller.

21. The system of claim 20, wherein the message recognition means further comprises means for decoding the telephone message using one of a class-based model and speaker trained model identified through the speaker identification means.

22. The system of claim 20, further comprising user interface means, responsive to the character spotting means, for displaying to a user the statement of the caller.

23. The system of claim 22, wherein the user interface means further comprises means for selectively displaying the statement to the user.

24. The system of claim 22, wherein the user interface means further comprises means for selectively initiating an audio playback of the telephone message to the user.

25. The system of claim 15, further comprising means for selectively permitting a caller access to a service in response to the identity of the caller.

26. The system of claim 15, further comprising means for enrolling the caller in the system if a substantial match is not found by the speaker identification means.

27. A method for performing recognition of characters included in a telephone message left by a caller in a telephone voice mail messaging system, the method comprising the steps of:
   (a) extracting a voice model of the caller from the telephone message;
   (b) comparing the voice model of the caller against a plurality of pre-obtained voice models respectively associated with a plurality of potential callers to find a pre-obtained voice model from among the plurality of pre-obtained voice models that matches the voice model of the caller;
   (c) if the matching pre-obtained voice model is found, then identifying at least one pre-obtained set of characters attributed to a potential caller from among the plurality of potential callers associated with the matching pre-obtained voice model;
   (d) identifying sets of characters in the telephone message;
   (e) comparing characters of the at least one pre-obtained set of characters identified in step (c) against characters of a set of characters identified in step (d); and (f) if the characters match, then outputting the characters of the at least one pre-obtained set of characters as representing the set of characters left by the caller as part of the telephone message.

28. The method of claim 27, further comprising the step of decoding the telephone message into a decoded message representative of the telephone message which may include one of a name of the caller, a telephone number of the caller and a statement made by the caller.

29. The method of claim 28, wherein the decoding step further comprises decoding the telephone message using one of a class-based model and a speaker trained model identified via step (b).

30. The method of claim 28, further comprising the step of replacing a set of corresponding characters in the decoded message with the set of characters output in step (f) to form a corrected decoded message.

31. The method of claim 30, further comprising the step of displaying to a user one of the name, the telephone number, and the statement of the caller from the corrected decoded message.

32. The method of claim 31, wherein the displaying step further comprises displaying one of the name, the telephone number and the statement of the caller to the user on a paging device.

33. The method of claim 27, further comprising the step of enrolling the caller in the system if a substantial match is not found via step (b).

34. A method for performing caller identification with respect to a telephone message left by a caller in a telephone voice mail messaging system, the method comprising the steps of:

(a) identifying sets of characters in the telephone message;

(b) comparing an identified set of characters against a plurality of pre-obtained sets of characters associated with a plurality of potential callers to find a a pre-obtained set of characters from among the plurality of pre-obtained sets of characters that matches the identified set of characters;

(c) if the matching pre-obtained set of characters is found, then identifying a list of potential callers attributed to the matching pre-obtained set of characters;

(d) extracting a voice model of the caller from the telephone message;

(e) comparing the voice model of the caller against respective voice models associated with potential callers on the list to find a respective voice model from among the respective voice models that matches the voice model of the caller; and (f) if the matching respective voice model is found, then identifying a potential caller from the list associated with the matching respective voice model.

35. The method of claim 34, wherein the pre-obtained set of characters and the set of characters identified in step (a) include a telephone number.

36. The method of claim 35, further comprising the step of identifying an actual telephone number associated with the identified caller.

37. The method of claim 36, further comprising the step of displaying to a user one of a name associated with the identified caller and the telephone number associated with the identified caller.

38. The method of claim 37, wherein the displaying step further comprises displaying one of the name and the telephone number of the caller to the user on a paging device.

39. The method of claim 34, further comprising the step of decoding the telephone message into a decoded message representative of the telephone message which may include a statement made by the caller.

40. The method of claim 39, wherein the decoding step further comprises decoding the telephone message using one of a class-based model and a speaker trained model identified via step (e).

41. The method of claim 39, further comprising the step of displaying to a user the statement of the caller.

42. The method of claim 34, further comprising the step of enrolling the caller in the system if a substantial match is not found via step (e).

* * * * *